Patented Sept. 6, 1949

2,481,479

UNITED STATES PATENT OFFICE 2,481,479

PROCESS OF PREPARING A PLASTICIZED GRANULAR SLAG-FORMING MASS FOR ELECTRIC WELDING

Jozef ter Berg and Gijsbert Jacob van Wijnen, Eindhoven, Netherlands, assignors to Hartford National Bank & Trust Co., Hartford, Conn., as trustee No Drawing. Application September 5, 1945, Serial No. 614,594. In the Netherlands May 29, 1942

Section 1, Public Law 690, August 8, 1946
Patent expires May 29, 1962

8 Claims. (Cl. 148—23)

1

It is known in the art of electric welding that a powdery or granular material may be used with a bare wire to effect a weld seam on a work-piece.

In this event it is desirable to utilize as a slag-forming material a mass which has been previously melted and which does not contain substances which split off gas, such as iron oxide, in order to avoid formation of pores during welding with a bare welding wire which is continuously held in this powdery or granular slag-forming mass.

In this connection it should be noted that in most cases it is preferable to utilize a granular instead of a powdery slag-forming mass, for example in order that the slag-forming mass may not be blown away during welding. Such a granular mass may be readily obtained from a mass which has been melted.

However, it is not necessary for the slag-forming mass for the above said process of electric welding to be previously melted and to avoid substances splitting off gas during welding, such as iron oxide and manganese oxide, if the said slag-forming mixture contains a reducing auxiliary material which counteracts the occurrence of pores which would otherwise be produced.

The present invention relates to a process of bringing a slag-forming mass into the granular state without it being necessary for the mass to be melted beforehand.

According to the present invention, a powdery slag-forming mixture is mixed with a plasticizing binder, the plastic product thus obtained being subsequently brought into the granular state, preferably by extrusion through an aperture for the purpose of obtaining a band or wire shaped mass which, preceded or followed by drying, is subdivided into small pieces.

In this case use may be made of plasticizing binders, as are known per se in ceramic technics.

We may mention, by way of example, a mixture constituted by 70 parts by weight of clay, 30 parts by weight of iron oxide and 10 parts by weight of ferro-manganese, the clay serving both as an essential ingredient of the slag-forming material and as a plasticizing binder. This mixture is treated with 20 parts by weight of water. After having been formed into grains, the electric welding with which the extremity of a bare welding wire is continuously held in this granular slag-forming material may be carried out successfully even with the aid of high currents.

Another example is a mixture of 50 parts by weight of chalk, 40 parts by weight of quartz, 4 parts by weight of calcium fluoride, 10 parts by

2 weight of ferro-manganese and 5 parts by weight of gum arabic or tragacanth, said mixture by means of a treatment with 20 parts by weight of water being brought into the plastic state and subsequently into the granular state. As a plasticizing binder we may cite, in addition, nitrocellulose dissolved for this purpose in an organic solvent such, for example, as amyl acetate and acetone.

What we claim is:

1. A process of preparing a slag-forming mass in the granular state in final usable form for electric welding, which comprises the steps of mixing powdery slag-forming material with a plasticizing binder, extruding the plasticized material, drying the extruded material, and subdividing the said dried pieces into granular shape suitable for direct use in a welding operation.

2. A process of preparing a granular slag-forming mass in final usable form for electric welding, which comprises the steps of mixing powdery slag-forming material with a plasticizing binder, extruding the plasticized material to form a strip thereof, drying the said extruded strip, and subdividing the dried strip into small pieces of granular form suitable for direct use in a welding operation.

3. A process of preparing a slag-forming mass in the granular state in final usable form for electric welding, which comprises the steps of mixing in powdery form approximately 70 parts by weight of clay, approximately 30 parts by weight of iron-oxide and approximately 10 parts by weight of ferro-manganese to form a plasticized mass, extruding the said plasticized mass to form a wire, drying the said wire, and subdividing the said dried wire into small pieces of granular shape suitable for direct use in a welding operation.

4. A process of preparing a slag-forming material in the granular state in final usable form for electric welding, which comprises the steps of mixing in powdery form approximately 70 parts by weight of clay, approximately 30 parts by weight of iron-oxide and approximately 10 parts by weight of ferro-manganese to form a plasticized mass, extruding the said plasticized mass to form a band, drying the said band and subdividing the said dried band into relatively small pieces of granular shape suitable for direct use in a welding operation.

5. A process of preparing a slag-forming mass in the granular state in final usable form for electric welding, which comprises the steps of mixing in a powdery form approximately 50 parts by weight of chalk, approximately 40 parts by weight of quartz, approximately 4 parts by weight of calcium-fluoride, approximately 10 parts by weight of ferro-manganese and approximately 5 parts by weight of gum-arabic, further mixing the said mixed material with approximately 20 parts by weight of water to form a plasticized mass, extruding the said mass, drying the said extruded mass, and subdividing the said dried mass into small pieces of granular shape suitable for direct use in a welding operation.

6. A process of preparing a slag-forming mass in the granular state in final usable form for electric-arc welding, which comprises the steps of mixing approximately 50 parts by weight of chalk, approximately 40 parts by weight of quartz, approximately 4 parts by weight of calcium-fluoride, approximately 10 parts by weight of ferro-manganese and approximately 5 parts by weight of tragacanth with approximately 20 parts by weight of water to form a slag-forming plasticized mass, extruding the said plasticized mass to form a wire, drying the said wire shaped mass, and subdividing the said dried mass into small pieces suitable for direct use in a welding operation.

7. A process of preparing a slag-forming mass in the granular state in final usable form for electric welding, which includes the steps of mixing powdery slag-forming material with a plasticizing binder consisting of nitro-cellulose dissolved in an organic solvent, extruding the said plasticized mass to form a strip, drying the said strip-shaped mass and subdividing the said dried strip into small pieces suitable for direct use in a welding operation.

8. A process of providing a slag-forming mass in the granular state in final usable form for electric-arc welding, which includes the steps of forming a powdery slag-forming mass with a plasticizing binder of nitro-cellulose dissolved in an amyl acetate organic solvent to form a plasticized mass, extruding the said mass, drying the extruded mass and subdividing the dried mass into a granular state suitable for direct use in a welding operation.

JOZEF TER BERG.
GIJSBERT JACOB VAN WIJNEN.

REFERENCES CITED

The following references are of record in the file of this patent:

UNITED STATES PATENTS

| Number | Name | Date |
| --- | --- | --- |
| 496,116 | Gale | Apr. 25, 1893 |
| 2,032,624 | Lyons | Mar. 3, 1936 |
| 2,043,960 | Jones et al. | June 9, 1936 |
| 2,065,157 | Stine | Dec. 22, 1936 |
| 2,107,434 | Wilson | Feb. 8, 1938 |
| 2,108,582 | Dunham | Feb. 15, 1938 |
| 2,141,929 | Moritz | Dec. 27, 1938 |
| 2,143,413 | Ellis | Jan. 10, 1939 |
| 2,152,286 | Schoenmaker | Mar. 28, 1939 |
| 2,194,200 | Cohn | Mar. 19, 1940 |
| 2,228,639 | Miller | Jan. 14, 1941 |
| 2,282,175 | Emerson | May 5, 1942 |
| 2,316,726 | Spicer et al. | Apr. 13, 1943 |
| 2,363,876 | La Lande, Jr. | Nov. 28, 1944 |